United States Patent
Bliemeister

[11] 3,785,711
[45] Jan. 15, 1974

[54] SUPPORT BEARING AND ASSEMBLY FOR ROTARY KILNS

[75] Inventor: Robert M. Bliemeister, Milwaukee, Wis.

[73] Assignee: Allis-Chalmers Corporation, Milwaukee, Wis.

[22] Filed: May 12, 1972

[21] Appl. No.: 252,632

[52] U.S. Cl. .............................. 308/237 R, 308/63
[51] Int. Cl. ............................................ F16c 11/00
[58] Field of Search .................. 308/37, 63, 38, 237, 308/240

[56] References Cited
UNITED STATES PATENTS

| | | | |
|---|---|---|---|
| 2,026,261 | 12/1935 | Vigne | 308/237 R |
| 1,593,251 | 7/1926 | Flintermann | 308/37 |
| 1,121,849 | 12/1914 | Kralund | 308/37 |
| 3,007,754 | 11/1961 | Cross | 308/237 R |

Primary Examiner—Charles J. Myhre
Assistant Examiner—R. H. Lazarus
Attorney—Arthur M. Streich, Robert B. Benson and John P. Hines

[57] ABSTRACT

A support assembly is disclosed for carrying rotating machines such as kilns, grinding mills and other such equipment. A support roller is provided with axially extending trunnions journaled in a semi-cylindrical journal bearing. The semi-cylindrical journal bearing is provided with a plurality of spacing means which may be small cylindrical plugs made of a bearing material, and which project radially inward from the inner circumferential surface of the semi-cylindrical bearing and engage the trunnion. The spacing plugs are arranged in two rows parallel to the trunnion axis with the rows being in close spaced relation to terminal edges of the semi-cylindrical bearing that are parallel to the trunnion. The two rows of spacing plugs are circumferentially spaced apart at least about 140°. Between the two rows of spacing plugs the bearing is provided with a continuous smooth inner circumferential surface without any such spacing means in order that a major portion thereof engages the outer circumference of the trunnion in load carrying support thereof. Each of the axially extending terminal edges of the bearing is connected to the inner circumferential bearing surface by a bevel surface which cooperates with the inner circumferential bearing surface and an adjacent portion of the outer circumferential surface of the trunnion, to define a reservoir for receiving and distributing lubricating oil on the portion of the bearing surface engaged in load carrying support of the trunnion.

3 Claims, 8 Drawing Figures

PATENTED JAN 15 1974

3,785,711

3,785,711

SUPPORT BEARING AND ASSEMBLY FOR ROTARY KILNS

BACKGROUND OF THE INVENTION

1. Field of the Invention

This invention relates to a support assembly for kilns, mills and other rotating machines having a trunnion journaled in bearings for rotation about a horizontal axis, and in particular to an improved journal bearing for such assemblies.

2. Description of the Prior Art

Machines such as rotary kilns are supported for rotational movement by a carrying mechanism having a support roller with axially extending trunnions. Each trunnion is supported by a semi-cylindrical bearing carried by a support base. According to teachings of the prior art, the surfaces of the trunnions and bearings are lubricated with oil taken from a reservoir beneath the bearing. Oil may be lifted from the reservoir to a distributor pan above the journal by a ladle attached to the trunnion to rotate with the trunnion as shown in U.S. Pat. No. 2,869,940. As the trunnion rotates, the ladle dips into the reservoir and scoops up a quantity of oil and when the ladle reaches the upper portion of its travel around the trunnion the ladle is inverted and the oil is poured from the ladle into the pan mounted above the trunnion. Oil may also be pumped to the pan as shown in U.S. Pat. No. 3,429,624. The oil runs from the distributor pan onto the top surface of the trunnion and as the trunnion rotates the oil is carried around the trunnion and into the bearing to prevent metal to metal contact between the trunnion and the bearing. A problem has occurred, however, and bearings have failed, when forces on the bearing cause axially extending terminal edges of the semi-cylindrical bearing to be forced toward the trunnion, squeezing or pinching the trunnion to a degree that lubricant does not get between the bearing and the trunnion, which causes bearing failure. It is to this problem that the present invention is directed and the solution of this problem is the primary object of the invention.

As will appear from the description of the present invention to follow, the present invention utilizes in certain embodiments thereof, plugs somewhat similar to plugs or other inserts in bearings shown in U.S. Pat. No. 66,472 of 1867; U.S. Pat. No. 174,331 of 1876; U.S. Pat. No. 259,255 of 1882; U.S. Pat. No. 2,971,248 of 1961; U.S. Pat. No. 3,161,449 of 1964; and U.S. Pat. No. 3,436,129 of 1969.

SUMMARY OF THE PRESENT INVENTION

According to a preferred embodiment of the present invention a support assembly for rotating machinery such as rotary kilns and the like is provided with a carrying roller having axially extending trunnions journaled in a semi-cylindrical journal bearing for rotation about a horizontal axis. A plurality of cylindrical plugs are inserted in the inner circumferential surface of the bearing, with part of each plug projecting radially inward of the inner circumferential surface of the bearing and engaging the outer circumferential surface of the trunnion. The plugs are arranged in two rows parallel to the axis about which the trunnions rotate, and in close spaced relation to axially extending terminal edges of the semi-cylindrical bearing. The two rows of plugs are circumferentially spaced apart at least about 140° and bound therebetween a continuous smooth inner circumferential surface which may have oil grooves but without any such spacing means in order that a major portion thereof engages the outer circumference of the trunnion in load carrying relation. Each axially extending terminal edge of the semi-cylindrical bearings is connected to the inner circumferential bearing surface by a bevel surface which cooperates with the inner circumferential bearing surface and an adjacent portion of the outer circumferential surface of the trunnion to define a reservoir for receiving and distributing lubricating oil on the portion of the bearing surface engaging the trunnion in load carrying relation. Other features and objects of the invention that have been attained will appear from the more detailed description to follow with reference to several embodiments of the present invention shown in the accompanying drawing.

DESCRIPTION OF THE PREFERRED EMBODIMENT

Figure 1:
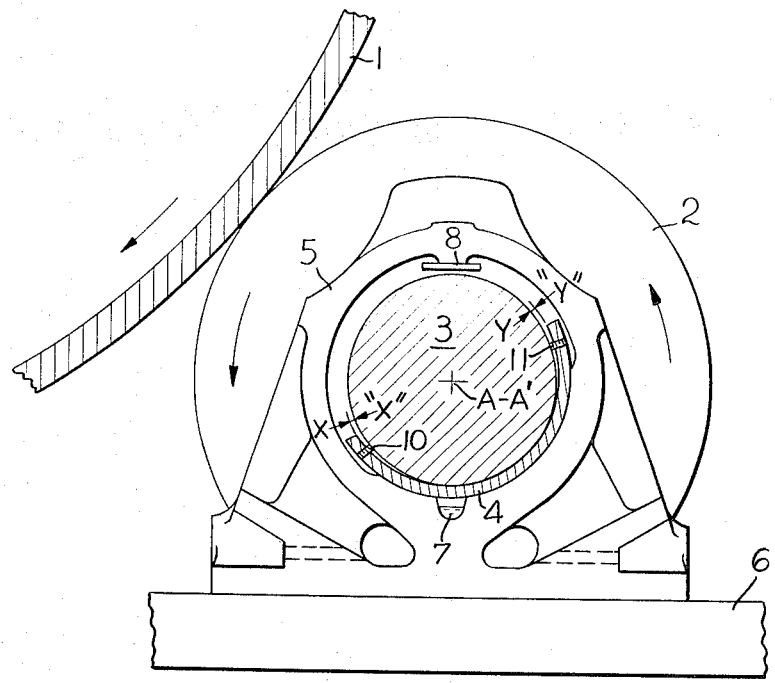
FIG. 1 of the accompanying drawing shows a fragmentary side elevation view partly in section showing a support assembly for such as a rotary kiln, according to the present invention.

Referring to FIG. 1 the present invention is shown in an embodiment in which a shell 1 such as the shell of a rotary kiln, is carried by a carrying roller 2 having an axially extending trunnion 3 for rotation about a virtually horizontal axis A-A', as indicated by arrows. The trunnion 3 is journaled in a semi-cylindrical journal bearing 4 which is in turn mounted in a bearing housing 5 carried on base structure 6. Lubricating oil from a reservoir 7 in the bearing housing 5 is delivered to a distributing pan 8 arranged above trunnion 3, by means not here shown but which may be as shown in U.S. Pat. No. 2,869,940 or U.S. Pat. No. 3,429,624. Oil runs from the pan 8 onto the top of the trunnion 3 and as the trunnion 3 rotates the oil is carried around and down the external circumferential surface of the trunnion 3 and between the trunnion 3 and bearing 4 to prevent metal to metal contact between the trunnion and the bearing.

In order to insure that lubricating oil will flow between trunnion 3 and bearing 4 and not be blocked from entry therebetween, a plurality of spacing means shown in FIG. 1 as plugs 10 and 11 are provided to maintain openings labeled X and Y in FIG. 1.

Figure 2:
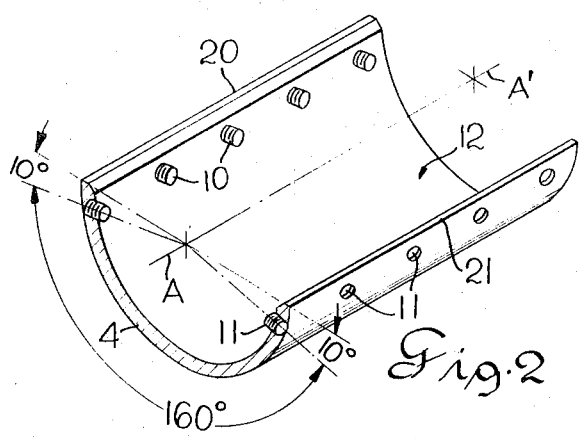
FIG. 2 is a perspective view of the semi-cylindrical journal bearing shown in FIG. 1.

Referring to FIG. 2 a semi-cylindrical bearing 4 is shown with a plurality of the plugs 10 and a plurality of the plugs 11 inserted into the inner circumferential surface 12 of bearing 4 and projecting radially inward thereof to engage the outer circumferential surface of trunnion 3 as shown in FIG. 1. With further reference to FIG. 2, the rows of plugs 10 and 11 are parallel to the axis A-A' about which the trunnion 3 rotates, and in close spaced relation to terminal edges 20 and 21 of the bearing 4. The terminal edges 20 and 21 are parallel to the axis A-A'. The row of plugs 10 and the row of plugs 11 are close to edges 20, 21, respectively, and are circumferentially spaced apart at least about 140° and preferably, as shown in FIG. 2, about 160°.

Between the row of plugs 10 and the row of plugs 11 the internal circumferential surface 12 of bearing 4 is a smooth continuous surface which may have oil grooves (not shown) but, as shown in FIG. 1, does not have spacing means in order that a major portion thereof engages the outer circumference of trunnion 3 in load carrying relation.

The manner in which the spacing means 10, 11 between bearing 4 and trunnion 3, may be made, formed, or attached thereto, will be described with reference to FIGS. 3 through 6A.

Figure 3:
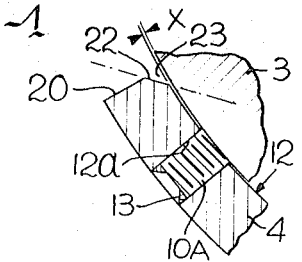
FIGS. 3 through 6A are fragmentary views showing several embodiments of the present invention.
Figure 4:
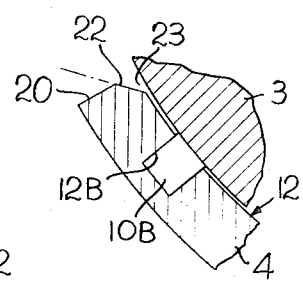
Figure 5:
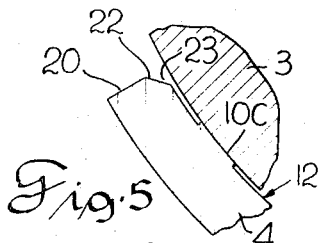
Figure 5A:
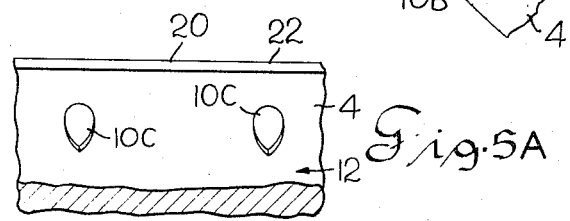
Figure 6:
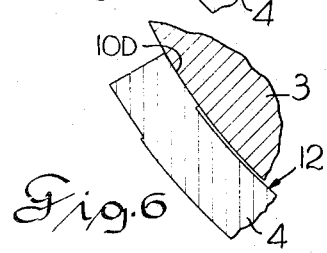
Figure 6A:
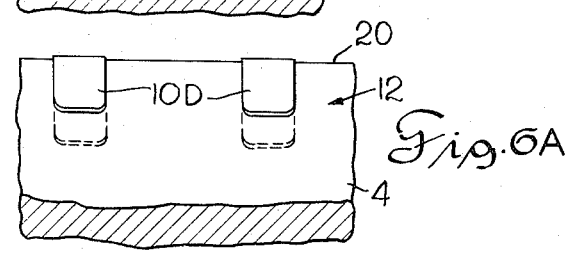

Referring to FIG. 3 a spacing means 10A is shown as a threaded plug turned into a tapped hole 12A and held in position against rotation by deposits of braizing metal 13. In FIG. 4 the spacing means is shown as a smooth surface plug 10B press fitted into a smooth bore receptacle 12B in bearing 4. FIG. 5 shows a spacing means that comprises a thin strip 10C of bearing metal soldered on the inner circumference of the bearing 4. As shown in FIG. 5A which is a view of FIG. 5 at right angles thereto, the bearing metal spacing means may have a configuration which is tear-drop shaped arranged with the apex of the tear-drop configuration pointed away from the adjacent terminal edge 20 for a purpose that will appear later in this description of the present invention. FIGS. 6 and 6A show how a spacing means 10D can be provided by displacing a portion of the bearing metal of bearing 4 radially inward as may be accomplished by forging or swaging with an appropriately shaped swage.

FIGS. 3 through 5A also show how the opening X, Y can be enlarged to provide a reservoir 23 for receiving and distributing lubricating oil between bearing 4 and trunnion 3. As shown in FIGS. 3 through 5A the terminal bearing edge 20 is connected to the inner circumference 12 of the bearing 4 by a bevel surface 22. The bevel surface 22 cooperates with the inner circumference 12 of bearing 4 and an adjacent portion of trunnion 3 to define the reservoir (numbered 23 in FIG. 4) between bearing 4 and trunnion 3.

In the operation of the described assembly according to the present invention, the kiln 1 is rotated by a gearing and driving motor (not shown). When the kiln 1 rotates clockwise carrying roller 2 will rotate in a counterclockwise direction as indicated by arrows. As the roller trunnion 3 turns with the roller 2 lubricating oil flows from the distribution pan 8 downwardly over the outer circumference of trunnion 3 and between trunnion 3 and bearing 4. The lubricating oil flows into the reservoirs 23 as shown in FIGS. 3 through 5 and between the inner circumference of the bearing 4 and trunnion 3 with the spacing means such as the plugs 10A in FIG. 3 maintaining a sufficient clearance X to permit an assured flow of lubricating oil between bearing 4 and trunnion 3 as needed to properly lubricate the load carrying surface of the bearing. With the spacing means such as plugs 10 and 11 being close to the edges 20, 21 as shown in FIG. 2 and with the inner circumference 12 of bearing 4 therebetween comprising a smooth continuous bearing surface, a major portion of the circumference 12 between the rows of spacing means 10 and 11 will engage the trunnion in load carrying relation as shown in FIG. 1.

If a journal bearing 4 is provided with only one row of plugs, such as the plugs 10 close to edge 20, the bearing 4 must be inserted in housing 5 with the plugs on the in-turning side of trunnion 3; i.e., the position of plugs 10 in FIG. 1, because most oil flow into bearing 4 is on the in-turning side of trunnion 3.

An added advantage may be achieved by the tear-drop shaped configuration and arrangement of spacing means as shown in FIG. 5A. As indicated in FIG. 5A the tear-drop shape spacing means 10C results in the space between adjacent such spacing means as 10C, diverging in the direction oil will flow therebetween and provides for the oil flow therebetween to spread out axially. The shape of spacing means 10C thereby minimizes interference with the oil that must flow toward the load carrying portion of the bearing 4 to cool and lubricate the load carrying surface.

From the foregoing detailed description of the present invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A support assembly for rotating machinery such as rotary kiln and the like having a trunnion journaled in a semi-cylindrical journal bearing having a pair of terminal edges parallel to a central axis through the trunnion, for rotation about the axis, the improvement comprising:
   A. A plurality of spacing means each comprising a portion of bearing material projecting radially inward of an inner circumferential surface of the semi-cylindrical bearing and engaging the outer circumferential surface of the trunnion;
   B. The spacing means being arranged in two rows parallel to the axis of rotation with each said row being in close spaced relation to one of the axially extending terminal edges of the semi-cylindrical bearing and said rows being circumferentially spaced apart at least about 140°; and
   C. Said bearing having a continuous smooth inner circumferential surface between said rows of spacing means with a major portion of said bearing surface between said rows engaging the outer circumference of the trunnion in load carrying support thereof.

2. A semi-cylindrical journal bearing for supporting rotary kilns or the like, having:
   A. A plurality of journal spacing means each comprising a portion of bearing material projecting radially inward of an inner circumferential surface of the semi-cylindrical bearing;
   B. Said spacing means being arranged in two rows parallel to an axis central to the semi-cylindrical bearing, with said rows being in close spaced relation to terminal edges of the bearing parallel to the axis, and said rows being circumferentially spaced apart at least about 140°; and
   C. Said bearing having a continuous smooth inner circumferential surface between said rows of spacing means for engaging a trunnion in load carrying relation thereto along a major portion of the inner circumference of the bearing between the rows of spacing means.

3. A bearing according to claim 2 in which each spacing means projects radially inward with a configuration which parallel to the inner circumference is a tear-drop configuration arranged with the apex of the tear-drop configuration directed away from the adjacent terminal edge of the bearing.

* * * * *